United States Patent [19]

Noonan

[11] 4,372,515

[45] Feb. 8, 1983

[54] CRT HOUSING SUPPORT AND ROCKING TILT APPARATUS

[75] Inventor: D. Thomas Noonan, Irving, Tex.

[73] Assignee: Xerox Corporation, Stamford, Conn.

[21] Appl. No.: 184,873

[22] Filed: Sep. 8, 1980

[51] Int. Cl.³ .............................................. F16M 11/04
[52] U.S. Cl. ..................................... 248/178; 248/371
[58] Field of Search ............... 248/178, 371, 133, 134, 248/139, 143; 297/262, 261

[56] References Cited

U.S. PATENT DOCUMENTS

| | | |
|---|---|---|
| 139,838 | 6/1873 | Van Dervort et al. ............. 297/262 |
| 317,933 | 5/1885 | Doubler ............................... 297/262 |
| 733,327 | 7/1903 | Moore ................................. 297/261 |
| 834,070 | 10/1906 | Nutter .................................. 297/261 |
| 1,416,699 | 5/1922 | Dyrssen ............................... 248/143 |
| 2,424,513 | 7/1947 | Stephan . | |
| 2,481,433 | 9/1949 | McBroom ....................... 248/133 X |
| 2,528,973 | 11/1950 | Radman . | |
| 2,604,536 | 7/1952 | Rose . | |
| 3,995,797 | 12/1976 | Knight ........................... 248/371 X |

*Primary Examiner*—Francis K. Zugel

[57] ABSTRACT

For use with a display unit for a word processing system, apparatus is provided for support of the display unit to allow the operator to easily and quickly change the tilt angle of the display unit and retain the tilt angle after a change thereof. The support and rocking tilt apparatus is mounted to the base of the display unit and includes fore/aft retention by a spur gear form on the upper support unit and a rack gear form on the lower support unit, which co-locates the origin of the arc of the rocker, the center of gravity and the origin of the arc of the pitch diameter of the spur gear of the display unit through the tilt range. Rocker means associated with the gear forms provides side-to-side retention of the support and rocking tilt apparatus. Vertical retention apparatus is combined with a snubbing device, including a spring-loaded friction mechanism, which provides infinite actuation throughout the tilt range.

4 Claims, 12 Drawing Figures

CRT HOUSING SUPPORT AND ROCKING TILT APPARATUS

The present invention relates in general to housings for operator display units and, more particularly, to apparatus for supporting and controlling the tilting and positioning of a housing for a display unit.

With the increased use of computers and word processing systems, there has been an increase in the use of display units for operator interface with the systems. Normally the display units comprise a cathode-ray tube (CRT), electronic circuitry and the housing unit, which results in a heavy unit. The use of the display units by various and different operators requires that the display unit be tiltable through at least 15 to 20 degrees of arc in the fore-and-aft directions in order to control glare from the screen and to achieve optimum reading angles for the operators. The display unit must be maintained at the desired degree of tilt when once positioned to that desired location.

U.S. Pat. No. 2,424,513 discloses apparatus adapted to adjustably support cathode-ray tubes used in projection television receivers. It is necessary to effect precisely controlled relative movement between the CRT and certain optical elements that define an optical axis. Such movement is required in the achievement of proper focus upon a viewing surface or screen. A movable frame member is disclosed for carrying the CRT. Through the use of threaded screws, bolts and wing nuts interacting with the frame member, accurate three-dimensional adjustment of the CRT screen with respect to the optical axis is accomplished. Any adjustment is tedious and time consuming because of the numerous individual screws and bolts involved with the adjustment.

U.S. Pat. No. 2,528,973 also discloses apparatus adapted to adjustably support a cathode-ray tube used in projection television receivers. A yoke is mounted for movement with respect to the X axis. A plate is mounted to the yoke for movement with respect to the Y axis. The cathode-ray tube is mounted to the plate for movement along the Z axis. Knurled adjusting nuts are used to make adjustments with respect to each individual axis.

U.S. Pat. No. 2,604,536 discloses a television set with the television tube mounted for rotation about a horizontal axis. The television tube is mounted to a shelf or platform, which is pivotable at the front portion thereof. A rod extends outwardly from the rear portion of the shelf and is positioned to travel in a channel formed in a bracket. A spring forces the rod against the channel to hold the assembly in position.

The invention as claimed is intended to provide a solution for various prior art deficiencies including the problem of how to easily, simply and quickly change the CRT tilt angle for operator viewing.

The advantages offered by the invention provide the operator with the simplest, fastest and most direct way of changing the CRT tilt angle. Low cost is provided through low number of easily manufactured parts, ease of assembly and maintenance, convenient connector location and/or cable routing to the CRT and little, if any, interference with the EME/EMI continuity of the CRT housing. The invention also provides infinite adjustment between predetermined limits without the use of latches or any external or internal yoke.

One means for carrying out the invention is described in detail below with reference to the drawing, which illustrates only one specific embodiment, in which.

Figure 1:
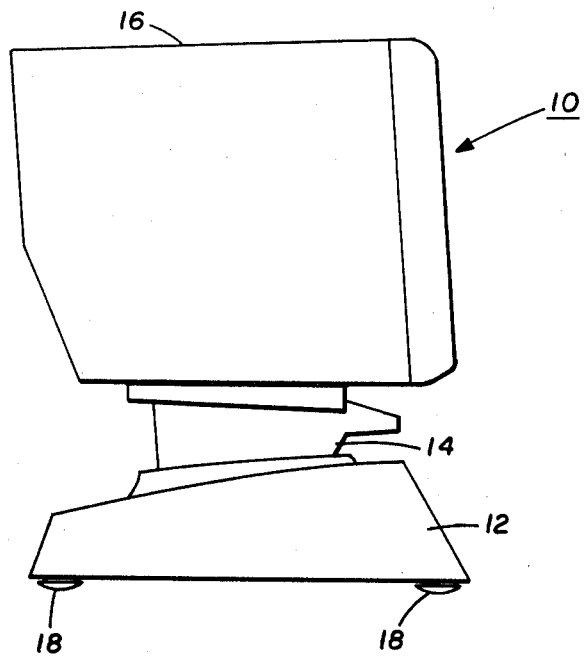
FIG. 1 is a simplified side view of a support and rocking tilt mechanism embodying the present invention.

Referring now to FIG. 1, a CRT housing support and rocking tilt apparatus 10 is shown comprising a base or base member 12 and a housing support 14 positioned in operative relationship with base 12. A CRT housing 16 is attached to housing support 14 with the face of the CRT (not shown) directed to the right where an operator (not shown) would be positioned. The housing support 14 with the CRT housing 16 attached will tilt or rotate clockwise and counterclockwise with respect to the stationary base 12 while resting on feet 18 (only two of four feet 18 are shown). Features of the CRT housing support 14 and rocking tilt apparatus 10, which will be discussed in further detail below with reference to various figures, include the rocking tilt feature, fore/aft retention, side-to-side retention, vertical retention and snubbing.

Tilt implies control, in some form, of the center of gravity (C.G.) of the CRT housing 16. Pivot points not on the center of gravity must have some mechanism to control moments developed around the pivot point by the C.G. These control mechanisms normally require an operator to crank, release, reset or otherwise operate a tilt control device. Past devices providing a pivot at the C.G. required a large yoke, either inside or outside the package. If the yoke is inside the package, it interferes with the package EME continuity; and if the yoke is outside the package, it must be dealt with aesthetically.

Figure 2:
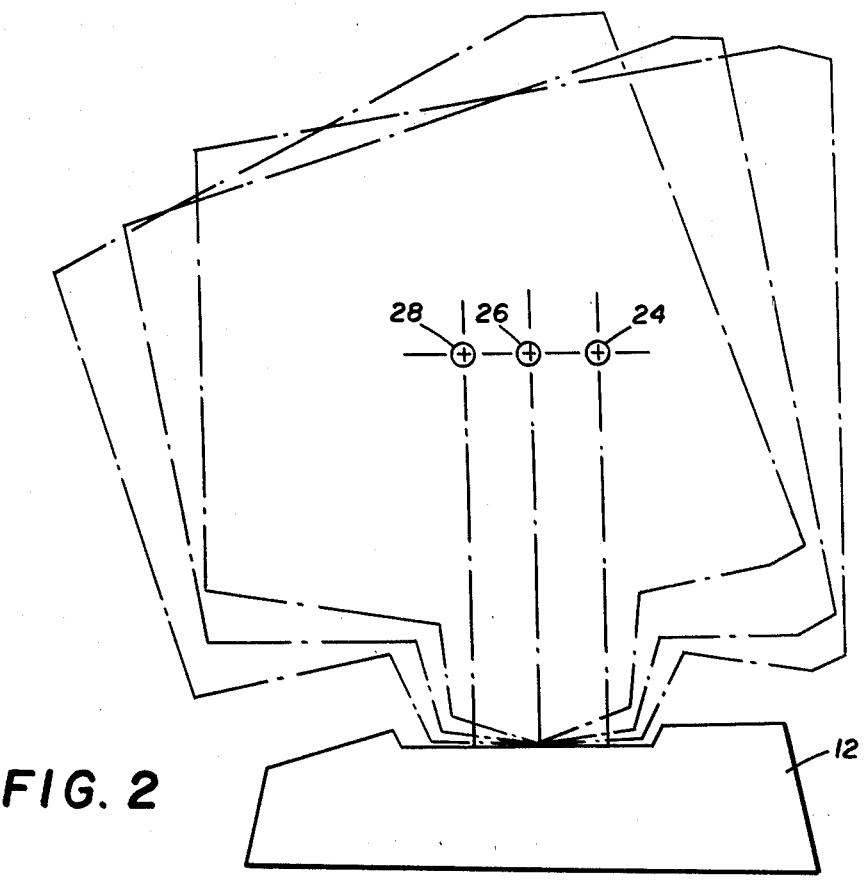
FIG. 2 is a simplified functional diagram illustrating the shift in C.G. of the CRT housing with changes in tilt.

A ball rolling on a flat surface develops no moments as the C.G. is also the center or origin of the arc. In any position in which the ball is placed, the C.G. is caused to be directly over the point of support. In a similar fashion, the present invention allows the CRT housing to be tilted on the short arc required by 15 to 20 degrees of tilt by co-locating the origin of the arc and the C.G. With reference to the sketch of FIG. 2, for 0 degree tilt (with respect to the horizontal) both the C.G. and the origin of the arc are located at point 24. As the tilt angle increases to 10 degrees, the C.G. and the origin of the arc both move to location 26. As the tilt angle goes to 20 degrees, the C.G. and the origin of the arc both move to location 28. The C.G. and the origin of the arc are always directly over the contact point (on the arc) between the base 12 and the housing support 14. The present invention provides for the co-locating of the origin of the arc and the C.G. This co-locating is accomplished by the use of a rocker mechanism and a rack gear form on the base 12 and a spur gear form on the housing support 14. The term "form" is used because the spur and rack act only as positioning devices; they do not transmit any power or torque and do not require close tolerances. With the use of two or three gear teeth, the fore/aft play can be constant through the full tilt range.

Figure 3:
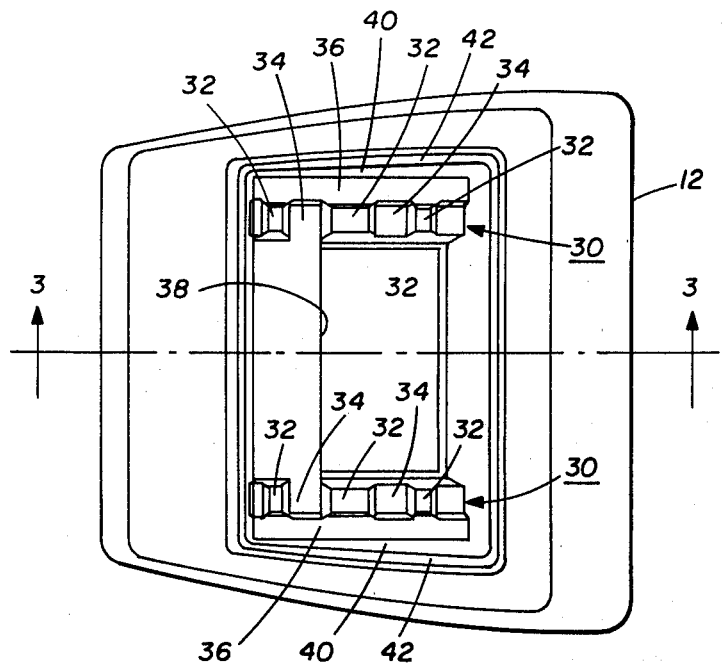
FIG. 3 is a simplified top view showing the base.
Figure 4:
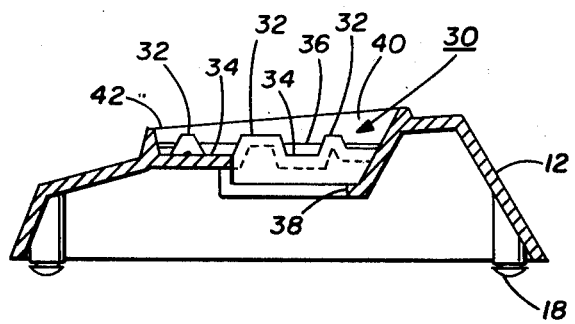
FIG. 4 is a simplified cross-sectional view taken along line 3—3 of FIG. 3 illustrating the rack gear form on the base.

With reference to FIGS. 3 and 4, rack gear form 30 is disclosed comprising tooth/teeth 32 and root/roots 34 in base 12. Rack gear form 30 lies in a horizontal plane. Straight rocker 36 also lies in a horizontal plane parallel but at the pitch diameter of rack gear form 30. Aperture 38 allows cables (not shown) to exit therethrough from the CRT housing 16 (not shown in these figures). Side 40 of raised section 42 provides side retention of housing support 14 with respect to base 12.

Figure 5:
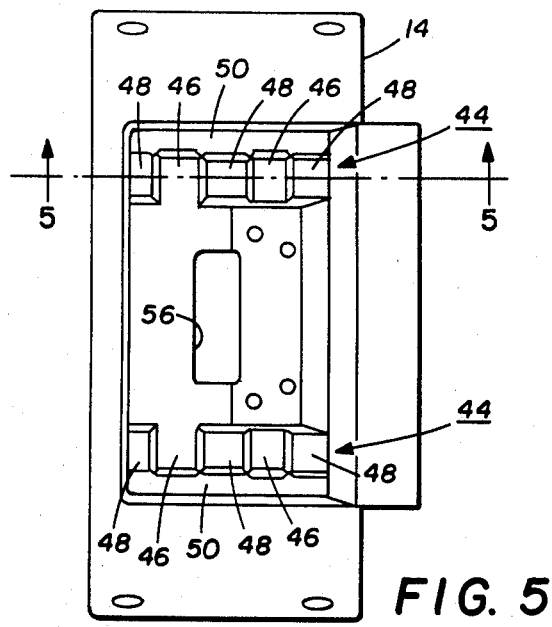
FIG. 5 is a simplified bottom view showing the housing support.
Figure 6:
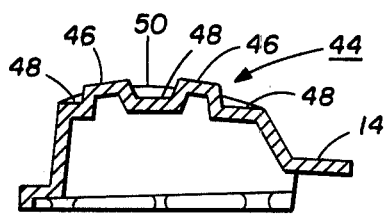
FIG. 6 is a simplified cross-sectional view taken along line 5—5 of FIG. 5 illustrating the spur gear form on the housing support.
Figure 9A:
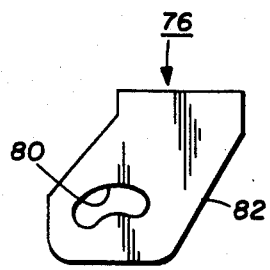
FIG. 9A is a simplified side elevational view of the pivot guide.
Figure 9B:
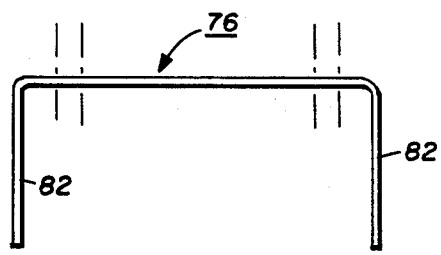
FIG. 9B is a simplified front elevational view of the pivot guide.
Figure 10A:
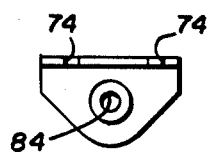
FIG. 10A is a simplified side elevational view of one bracket assembly.
Figure 10B:
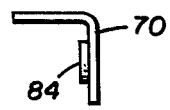
FIG. 10B is a simplified front elevational view of one bracket assembly.

With reference to FIGS. 5 and 6, spur gear form 44 is disclosed comprising tooth/teeth 46 and root/roots 48 in housing support 14. Spur gear form 44 mates and cooperates with rack gear form 30 in controlling the fore/aft rocking tilt function. Curved rocker 50 positioned outboard of spur gear form 44 mates and cooperates with straight rocker 36 during the fore/aft rocking tilt function. The straight rocker 36 and curved rocker 50 cooperate to support the load of the CRT housing 16 and maintain the vertical tooth clearance 54 (see FIG. 7) of the rack gear form 30 and the spur gear form 44. In order to retain the same rolling relationship as the curved rocker 50 with the straight rocker 36, one-half of the pitch diameter of the spur gear 44 must equal the radius of the arc of curved rocker 50. Throughout the tilt range of the CRT housing 16, the C.G. of the CRT housing 16, the origin of arc of the pitch diameter of the spur gear and the origin of arc of the curved rocker 50 all move together. The radius of the curved rocker 50 is equal to one-half of the pitch diameter of the spur gear. Aperture 56, together with aperture 38 (see FIG. 3), allows the required cables (not shown) from the CRT housing 16 to pass through the CRT housing support and rocking tilt apparatus 10 because little relative motion occurs between the base 12 and housing support 14 at this location. When passed through this area, cables from the CRT housing 16 will exert minimum influence on the C.G. of the CRT housing 16 throughout its tilt range.

Figure 7:
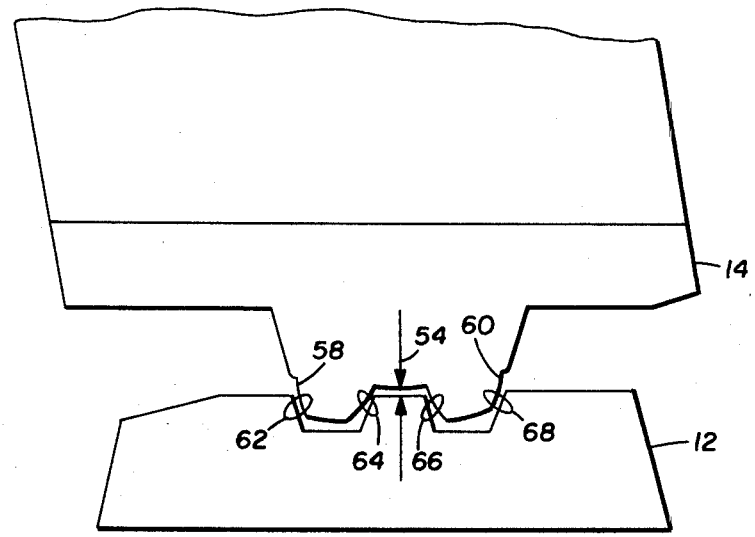
FIG. 7 is a simplified functional diagram illustrating the involute gear form.

Teeth of the spur gear form 44 and the rack gear form 30 may be designed such that if molded of structural foam or other plastic, the mold may be pulled from the bottom. The gear selected for the spur gear form 44 was a standard involute at 20 degrees with N=70.68 teeth and D=15 inches. This provided a 3.5 degree of draft at points 58 and 60 (see FIG. 7). Areas 62–68 as shown in FIG. 7 show the contact areas between the rack gear form 30 and the spur gear form 44 as the CRT housing 16 is tilted. For moldability, teeth were filled in or eliminated to double each remaining tooth in size. Of course, the rack gear form 30 was designed to mate with the spur gear form 44. The spur gear form 44 was drawn and layed out by the approximate circle-arc method so the curve of the face is not an exact involute. The gear forms were calculated in accordance with standard formulas such as those found in "Standard Handbook for Mechanical Engineers", Seventh Edition, McGraw-Hill Book Company, and "Gear Handbook", First edition, Darle W. Dudley, McGraw-Hill Book Company, and using the following dimensions:

p=0.666 inches
$p_d$=4.712 inches
$h_t$=0.458 inches
N=70.68 teeth
D=15 inches
$D_O$=15.424 inches
$D_R$=14.509 inches
a=0.212 inches
b=0.246 inches
t=0.333 inches Vertical retention is needed to hold the base 12 onto the housing support 14 and the CRT housing 16 when the CRT housing 16 is lifted up and moved about. The means for vertical retention, as shown in FIGS. 8, 9A, 9B, 10A and 10B, includes two bracket assemblies 70, which are attached to the underside of base 12 by fasteners 72 through apertures 74. Pivot assembly 76 is attached to the underside of housing support 14 by fasteners 78 and is positioned in operative relationship to the two bracket assemblies 70. An arcuate aperture 80 is formed in each leg 82 of pivot assembly 76. Aperture 84 of each bracket assembly 70 is positioned such as to be aligned with arcuate aperture 80 of a corresponding leg 82 of pivot assembly 76 throughout the tilt range of the CRT housing support and rocking tilt apparatus 10. Fasteners 86 are positioned through arcuate apertures 80 and apertures 84 and thereby assure vertical retention of the base 12 with respect to the housing support 14.

Figure 8:
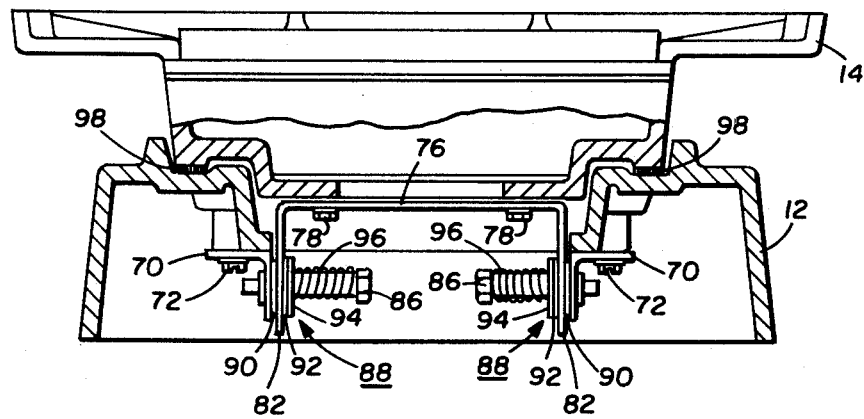
FIG. 8 is a simplified sectional view of the invention showing the relationship between the base and the housing support.

The operation of the rocker means comprising the straight rocker 36 and the curved rocker 50, together with the rack gear form 30 and the spur gear form 44, provides the rocking tilt and fore/aft retention under ideal conditions. However, some conditions sometimes occur that require additional stability. Such conditions include C.G. variations, due to manufacture tolerances or internal design changes to the CRT housing 16, tilt moments introduced by non-level desktops, movement of base 12 around fastener 86 when the CRT housing 16 is lifted and moved or tilted, etc. This additional stability is supplied by a snubber device in the form of a spring-loaded friction mechanism 88, which was combined with the vertical retention device. With reference to FIG. 8, one nylon washer 90 is positioned between each leg 82 of pivot assembly 76 and the corresponding bracket assembly 70. An additional nylon washer 92 is positioned inboard of each leg 82 with a metal washer 94 positioned inboard of each nylon washer 92. A coil spring 96 is positioned around each fastener 86 with the fastener 86 passing through aperture (not shown) in all the washers (see FIG. 8) such that all the washers are compressed against contact portions of each leg 82 of pivot assembly 76 and bracket assemblies 70 to comprise a friction mechanism 88, which provides infinite versus discrete actuation throughout the tilt range. Also with reference to FIG. 8, rectangular pad 98 is attached to straight rocker 36 to provide a smooth, soft surface of contact for curved rocker 50. Pad 98 assures a smooth rock/tilt movement.

The present invention provides the operator with a simple, fast and direct way of changing the tilt angle of the CRT housing 16. When it becomes necessary for the operator to change the tilt, the operator places a hand on the top portion of the CRT housing 16 and applies sufficient pressure to move the CRT housing 16 to the new desired tilt. During the tilt movement, the straight rocker 36, together with curved rocker 50 (with rectangular pad 98 positioned therebetween for smooth, quiet operation), supports the moving load of the CRT housing 16 while the interaction of rack gear form 30 and spur gear form 44 assures a smooth tilt rather than any translational movement of the CRT housing 16. The interaction of rack gear form 30 and spur gear form 44 maintains the CRT housing 16 at the rest position when the operator removes the hand from the CRT housing 16. To further assure that the CRT housing will remain at the set position, the spring-loaded friction mechanism 88 provides additional forces to provide further holding of the CRT housing in the set position. The amount of tension provided by the spring-loaded friction mechanism 88 is adjustable by increasing or decreasing the force applied by springs 96 (see FIG. 8) through adjustment of fasteners 86. The operator can change the tilt of CRT housing 16 without having to locate and turn a control handle, a knob, a crank, releasing, resetting, etc. Primary control of shifts in the C.G. of the CRT housing 16 is accomplished by the spring-loaded friction mechanism 88. Other means may also be employed such as adjusting the mounting position of the CRT housing 16 fore and aft with respect to the housing support 14. Also the front and/or rear feet 18 could be adjusted to cause a slight incline to the CRT housing support and rocking tilt apparatus 10.

Although the present invention has been described with reference to a presently preferred embodiment, it will be appreciated by those skilled in the art that various modifications, alternatives, variations, etc. may be made without departing from the spirit and scope of the invention as defined in the appended claims.

What is claimed is:

1. Apparatus for supporting a display housing while providing rocking tilt adjustment, said apparatus comprising:
   a housing support member operatively connected to said housing;
   a base member;
   means for mounting said base member to said housing support member to allow a rolling tilt movement therebetween, said means for mounting including an involute gear form and rocker means;
   vertical retention means for preventing separation of said base member and said housing support member when upward force is applied to said housing support member, said vertical retention means including a U-shaped bracket attached to said housing support member and positioned such that the open portion of the U-shaped bracket is directed away from the housing support member, each end portion of the U-shaped bracket being formed to provide an arcuate shaped aperture therein, two L-shaped brackets attached to the base member with one end portion of each L-shaped bracket being formed to provide an aperture therein, said L-shaped brackets being positioned with the end portion containing the aperture in operative relationship with the aperture formed in a corresponding end portion of the U-shaped bracket, fastener means operatively positioned through said apertures;
   said vertical retention means including a spring-loaded friction mechanism operatively associated with said vertical retention means to assure that said housing support member retains its position with respect to said base after a rocking tilt adjustment has been completed.

2. Apparatus as recited in claim 1 wherein said involute gear form includes a rack gear form on said base member coacting with a spur gear form on said housing support member, said gear forms being so constructed and arranged to allow for relative movement therebetween.

3. Apparatus as recited in claim 2 wherein said rocker means includes a flat rectangular member on said base member coacting with an arcuate rectangular member on said housing support member, said rectangular members being so constructed and arranged to allow for relative movement therebetween.

4. Apparatus as recited in claim 3 further including side retention means to assure alignment of coacting portions of the rocker means and the involute gear forms, said side retention means includes substantially parallel and vertical walls formed in said base member on each side of said flat rectangular member whereby said arcuate rectangular member is prevented from moving in a lateral direction with respect to said flat rectangular member.

* * * * *